(12) United States Patent
Vichniakov et al.

(10) Patent No.: US 11,173,670 B2
(45) Date of Patent: Nov. 16, 2021

(54) METHOD FOR CONNECTING COMPONENTS WHICH HAVE A FIBRE-REINFORCED THERMOPLASTIC PLASTIC

(71) Applicant: Airbus Operations GmbH, Hamburg (DE)

(72) Inventors: Alexei Vichniakov, Hamburg (DE); Jens Standfuss, Pirna (DE); Sebastian Schulze, Dresden (DE)

(73) Assignee: Airbus Operations GmbH

( * ) Notice: Subject to any disclaimer, the term of this patent is extended or adjusted under 35 U.S.C. 154(b) by 0 days.

(21) Appl. No.: 16/823,742

(22) Filed: Mar. 19, 2020

(65) Prior Publication Data
US 2020/0307111 A1 Oct. 1, 2020

(30) Foreign Application Priority Data
Mar. 27, 2019 (DE) ...................... 10 2019 107 814.8

(51) Int. Cl.
*B29C 65/06* (2006.01)
*B29C 65/74* (2006.01)
*B29C 65/00* (2006.01)

(52) U.S. Cl.
CPC ........ *B29C 65/0681* (2013.01); *B29C 65/743* (2013.01); *B29C 66/71* (2013.01); *B29C 66/72141* (2013.01); *B29C 66/81411* (2013.01)

(58) Field of Classification Search
CPC ... B29C 65/0681; B29C 65/745; B29C 66/71; B29C 66/72141; B29C 66/81411;
(Continued)

(56) References Cited

U.S. PATENT DOCUMENTS 7,507,310 B2 * 3/2009 Manicke ............. B29C 65/0681
156/73.5
9,333,703 B2 * 5/2016 Goehlich ................ B29C 65/72
(Continued)

FOREIGN PATENT DOCUMENTS

DE 102005033992 B3 4/2007
DE 102011078144 A1 12/2012
(Continued)

OTHER PUBLICATIONS

Machine translation of EP 0157173 date unknown.*
German Search Report for Application No. 102019107814.8, dated Oct. 4, 2019, pp. 1-8 (p. 2 categorizing the cited references).

*Primary Examiner* — John L Goff, II
(74) *Attorney, Agent, or Firm* — Lerner, David, Littenberg, Krumholz & Mentlik, LLP

(57) ABSTRACT

A method for connecting components having a fibre-reinforced thermoplastic plastic includes provision of a first component with a first joining surface, provision of a second component with a second joining surface, flush placement of the first joining surface against the second joining surface in order to form a connection joint, placement of a friction stir welding tool against the connection joint, or a surface directly adjacent thereto, of at least one of the components, softening of the first component and the second component, in each case in a region adjacent to the connection joint, by rotation of the tool, such that the thermoplastic plastic of the two components locally fuses, and movement of the tool along the connection joint for the purposes of connecting the two components by formation of a fusion seam, wherein portions of reinforcement fibres are stirred in to increase the strength of the fusion seam.

11 Claims, 4 Drawing Sheets

(58) Field of Classification Search
CPC ..... B29C 66/23; B29C 66/232; B29C 66/234; B29C 65/06; B29C 66/43; B23K 20/122; B23K 20/127
USPC ........................................................ 156/73.5
See application file for complete search history.

(56) References Cited

U.S. PATENT DOCUMENTS

| | | |
|---|---|---|
| 2009/0263676 A1 | 10/2009 | Litzenberger et al. |
| 2012/0193401 A1* | 8/2012 | Hori ................... B23K 20/1265 228/112.1 |
| 2012/0328837 A1 | 12/2012 | Goehlich et al. |
| 2016/0176102 A1 | 6/2016 | Silvanus et al. |

FOREIGN PATENT DOCUMENTS

| | | | | |
|---|---|---|---|---|
| EP | 0157173 A2 * | 10/1985 | ............. | B29C 66/71 |
| EP | 1941987 A1 | 7/2008 | | |
| EP | 3034276 A1 | 6/2016 | | |
| JP | 2003136256 A | 5/2003 | | |
| WO | 2010067796 A1 | 6/2010 | | |
| WO | 2017210504 A1 | 12/2017 | | |

* cited by examiner

METHOD FOR CONNECTING COMPONENTS WHICH HAVE A FIBRE-REINFORCED THERMOPLASTIC PLASTIC

FIELD OF THE INVENTION

The invention relates to a method for connecting components which have a fibre-reinforced thermoplastic plastic. The invention furthermore relates to the use of a friction stir welding tool for connecting two components composed of a fibre-reinforced plastic.

BACKGROUND OF THE INVENTION

For the connection of components for any purposes, a very large number of different connecting methods exist. These connecting methods may be selected and used in a manner dependent on the required strength or other mechanical characteristics. For the connection of fuselage components of passenger aircraft, use is for example commonly made of rivet connections, which have proven successful over many decades. By means of rivet connections, both metallic components and components composed of fibre-reinforced plastics can be connected. For the connection of fibre-reinforced or non-fibre-reinforced thermoplastic plastics, use may be made of welding methods in which, for example, joining surfaces are warmed and fused together by means of ultrasound.

DE 10 2005 033 992 B3 presents, for example, a method for connecting at least two areal structures, in particular at least two metal sheets, for a lightweight structure, and a connection and lightweight structure. Here, it is proposed that mechanical machining of areal structures be performed, following which adhesive bonding of said areal structures is performed.

BRIEF SUMMARY OF THE INVENTION

An aspect of the invention proposes an alternative method for connecting components which have a fibre-reinforced thermoplastic plastic.

A method for connecting components which have a fibre-reinforced thermoplastic plastic is proposed, the method having the steps of provision of a first component with a first joining surface, of provision of a second component with a second joining surface, of flush placement of the first joining surface against the second joining surface in order to form a connection joint, of placement of a friction stir welding tool against the connection joint, or a surface directly adjacent thereto, of at least one of the components, of softening of the first component and of the second component, in each case in a region adjacent to the connection joint, by rotation of the tool, such that the thermoplastic plastic of the two components locally fuses, and of movement of the tool along the connection joint for the purposes of connecting the two components by formation of a fusion seam, wherein portions of reinforcement fibres are stirred into the fusion seam in order to increase the strength of the fusion seam.

The first component and the second component may be shaped in any desired manner and may be composed partially or entirely of a thermoplastic plastic which is reinforced with reinforcement fibres. In the context of the invention, the joining surfaces are to be regarded as the surfaces at which the two components are connected and with which the connection joint is generated. As stated further below, the joining surfaces may also be of different type depending on the desired form of the connection joint. Here, consideration may be given in particular to the various connection joints that are used in the case of conventional welding methods.

A friction stir welding tool commonly has a rotating tool tip composed of a shoulder and a pin, which tool tip can be pressed against a surface of a workpiece, that is to say of the first and/or second component, and rotated. As a result of rotation of the tool tip, surface friction is generated between a surface of the tool tip and the corresponding workpiece surface. In this way, heat is generated which leads to a softening or melting of the thermoplastic plastic. It may be expedient for the tool tip to be designed such that it penetrates into, and stirs, the molten material. Thus, in the case of joining surfaces bearing against one another, thorough mixing of the molten material of the two joining surfaces can be realized, such that a fully materially bonded connection of the two components is generated. Furthermore, air inclusions can be prevented by means of the stirring of the material.

The method according to an aspect of the invention can consequently weld components which have a fibre-reinforced thermoplastic plastic to one another by action of a friction stir welding tool, which is realized by movement of the rotating tool along the connection joint. This yields a fusion seam in which the material of the two components for joining together has been fused. A special feature here lies in the fact that, as a result of the rotation of the tool, portions of reinforcement fibres in the form of short fibres are distributed in the molten material. The resulting fusion seam accordingly has a multiplicity of short fibres, which collectively greatly increase the strength of the fusion seam. It would consequently be possible for the method according to the invention to also be used for components and component connections that are subjected to relatively high load.

In a preferred variant, the reinforcement fibres are comprised in the components, and the portions of the reinforcement fibres are separated from the respectively adjacent regions of the components, and stirred into the fusion seam, as a result of the rotation of the tool. The short fibres stirred into the fusion seam are consequently cut-off portions of reinforcement fibres that project from the components directly into the molten region. It is furthermore not necessary for short fibres to be separately added during the fusion process, said short fibres rather being generated directly during the machining of the two components.

In an advantageous embodiment, the tool has a frustoconical tip with a lateral surface on which radial projections, channels or indentations are arranged, wherein the tool cuts the reinforcement fibres. The radial projections, channels or indentations may be designed similarly to a thread. The pitch thereof may be adapted, together with the direction of rotation of the tool, such that material from the joining point is raised in the direction of the tool or is lowered in the direction of a weld substrate, such that thorough mixing or stirring occurs, and air inclusions are prevented. The movement of the softened material is guided by a radial shoulder arranged on the tool tip. Numerous different geometries of such tools are known which are optimized for different materials, machining speeds and similar parameters. To optimize the method according to the invention, it may be expedient to investigate different tool geometries for their suitability, in particular in a manner dependent on the reinforcement fibres used and the thermoplastic matrix.

Preferably, during the movement along the connection joint, the tool is pressed on in order to generate a targeted surface friction. As a result of the pressing-on, the friction between the tool and the respective component can be controlled in an effective manner, such that the degree of fusion could be determined.

In one advantageous embodiment, the connection joint is a butt joint, in the case of which the first joining surface and the second joining surface are in each case end surfaces and lie against one another in butting fashion, wherein the tool is moved along the connection joint transversely with respect to the components and an axis of rotation of the tool runs parallel to the joining surfaces. In the case of the butt joint, it is for example possible for the end edges of two areal components to butt directly against one another in order to form a narrow, strip-like connection joint. As a result of the tool being guided directly along the connection joint transversely with respect to the components, the material is adjacently fused together directly at the connection joint. The tensile strength of the connection is then dependent exclusively on the tensile strength of the fusion seam in the direction of tension. As discussed further above, the tensile strength can, owing to the stirred-in portions of reinforcement fibres, be assumed to be considerably higher than in the case of conventionally welded components, which are based solely on the action of heat by means of ultrasound, infrared or other methods.

The connection joint could however also be a corner joint, T joint or oblique joint, and the two components could form an inside edge here, wherein the tool is placed against the inside edge and an axis of rotation of the tool encloses a substantially equal angle with both components. In the case of such a joint, the two components are not connected to one another at their end edges, but rather stand at a particular angle with respect to one another, which may be preferably considerably greater than 0° and considerably less than 180°. Since the connection joint is situated between the components and, in the case of many angles, is not directly accessible for the rotating tool, the tool can duly be guided along the connection joint, but an axis of rotation can enclose the same angle with both components. The two components and the axis of rotation consequently preferably form a symmetrical arrangement. The resulting fusion path then forms a bead between the two components, the surface of which bead runs, for example, transversely with respect to both components.

The connection joint could alternatively also be an overlap joint, wherein the tool is placed onto one of the components and is oriented transversely with respect to the joining surface, wherein the tool generates a fusion seam which extends from the component directly adjacent to the tool into the adjacent other component. In the case of an overlap joint, too, a fusion seam can be generated from one side of one of the components. For this purpose, the tool is placed onto one of the components at a component surface averted from the joining surface. As a result of the pressing-on of the rotating tool and the movement along the connection joint, a strip-shaped region of the respective component is melted, which region extends into the adjacent other component. The extent of the fusion seam and a tensile force plane are transverse with respect to one another in the case of an overlap joint, such that higher tensile forces can be possible.

It is conceivable for two or more mutually spaced-apart fusion seams to be generated at the same joining surface. The tensile strength of this connection can be yet further increased by the application of further fusion seams. It is conceivable for two or more fusion seams to be provided which are arranged for example parallel to one another and which are situated on the components.

In one advantageous variant, the connection joint is formed along a closed contour. This may be realized in particular in the case of flat components which can be positioned on one another in a flush manner An application example is for example a fastening element on an inner side of a fuselage component, composed of a thermoplastic material, of an aircraft.

It is advantageous if the thermoplastic plastic is selected from a group of plastics, the group comprising PPS, PEEK, PEKK, PEI, PAEK and others. These have, in particular in conjunction with reinforcement fibres, a high strength and a relatively high continuous service temperature.

It is conceivable to additionally also weld metallic components to such a component which is composed of a thermoplastic plastic.

The reinforcement fibres could be carbon fibres or glass fibres. These are available in very high production quality on an industrial scale and can furthermore be cut by means of the abovementioned tool.

In addition to the portions of reinforcement fibres, it would furthermore be possible for an additive to be mixed in in order to improve the characteristics of the fusion seam. These may for example be additional short fibres or nanoparticles. It is conceivable for this additive material to be dispensed in continuous fashion through a nozzle or some other dispensing device during the welding process.

The components are advantageously in the form of fuselage or structural components of an aircraft. It is thus possible, for example, for fuselage components or structural components to be welded to one another, wherein the fusion seam has a particularly high strength.

The invention furthermore relates to the use of a friction stir welding tool for connecting two components composed of a fibre-reinforced plastic, forming a fibre-reinforced fusion seam. The use of a friction stir welding tool for connecting components which have a thermoplastic fibre reinforced material has particular advantages with regard to the strength of the fusion seams that can be realized, and is thus superior to the conventional, purely heat-based method.

BRIEF DESCRIPTION OF THE DRAWINGS

Further features, advantages and possible uses of the present invention will emerge from the following description of the exemplary embodiments and from the figures. Here, all of the features described and/or illustrated in the figures form the subject matter of the invention individually and in any desired combination, even independently of the combination of said features in the individual claims or the back-references thereof. Furthermore, in the figures, the same reference signs are used for identical or similar objects.

DETAILED DESCRIPTION

Figure 1:
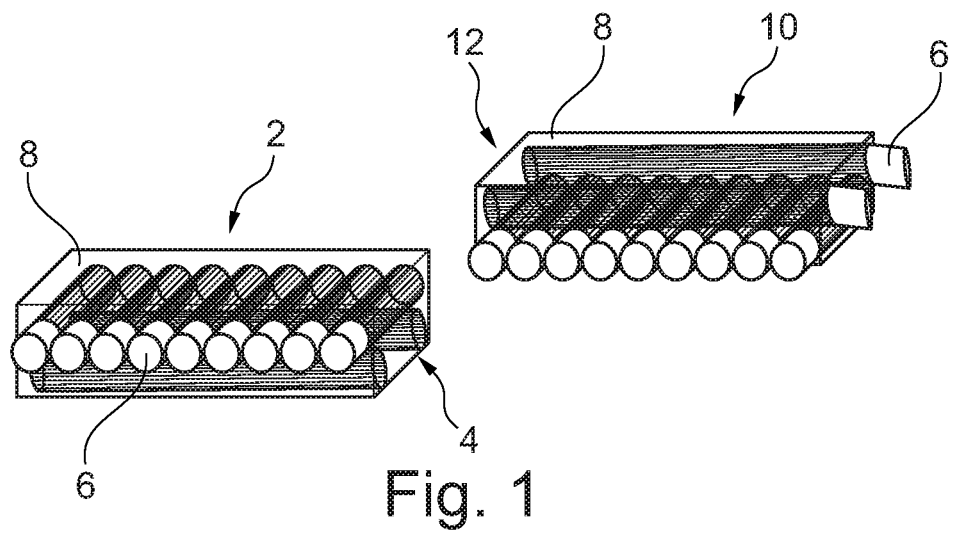
FIGS. 1 to 3 show two components which form a butt joint and which are connected to one another.

FIG. 1 shows, in highly schematic form, a first component 2 with a first joining surface 4, reinforcement fibres 6 contained therein, and a matrix material 8, surrounding the reinforcement fibres 6, in the form of a thermoplastic plastic. The first component 2 may extend over a considerably larger area, and be of a different construction, than illustrated here.

The present illustration is intended merely to illustrate the individual method steps. FIG. 1 furthermore shows a second component 10 with a second joining surface 12, reinforcement fibres 6, and a matrix material 8 in which the reinforcement fibres 6 are embedded.

By way of example, the matrix material of the two components 2 and 10 is polypropylene styrene (PPS), polyether ether ketone (PEEK), polyether ketone ketone (PEKK), polyetherimide (PEI), polyaryl ether ketone (PAEK), or some other thermoplastic material. It may be expedient for the reinforcement fibres 6 to be realized for example as carbon fibres, though glass fibres could also be expedient for components for which lower loads are to be expected.

For the connection of the two components 2 and 10, the two joining surfaces 4 and 12 are placed against one another. The joining surfaces then butt against one another in a flush manner, such that no gap is situated in between. This yields a connection joint 14, which in this case is a butt joint.

For the connection of the two joining surfaces 4 and 12, a tool 16 is placed on and is moved along the connection joint 14. This yields the fusion seam 18 shown in FIG. 3. Said fusion seam extends all the way through both components 2 and 10, wherein, as a result of action of the tool 16, matrix material from adjacent regions 20 and 22 of the two components 2 and 10 is fused and stirred. This leads to a materially bonded connection with high load-bearing capacity.

Figure 2:
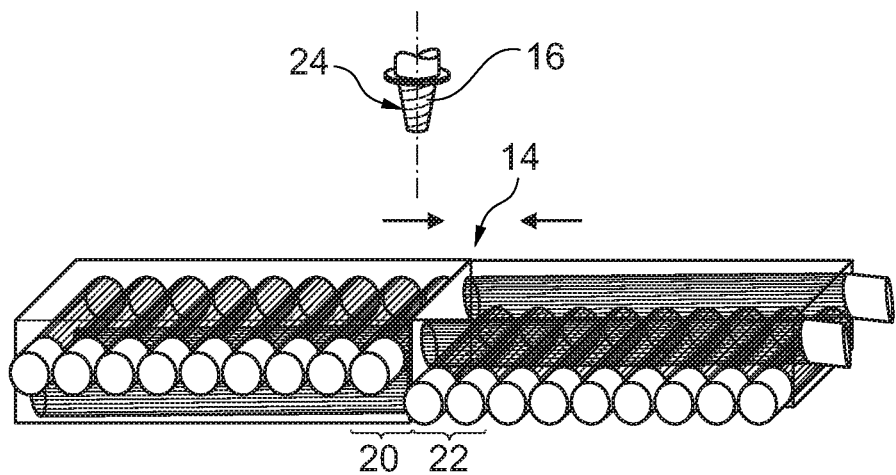

As is illustrated in highly schematic form in FIG. 2, the tool 16 is a friction stir welding tool, which is formed with radial projections 24 or channels and/or indentations on a circumferential surface and which thereby leads to stirring of the softened material. The projections 24 furthermore have the effect that, in the adjacent regions 20 and 22, portions of the reinforcement fibres 6 are cut off and stirred into the fusion seam 18 by the tool 16. This consequently leads to reinforcement of the fusion seam 18 by means of short fibres, which further increases the strength.

Figure 4A:
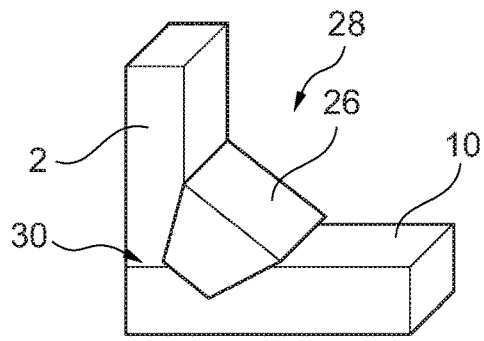
FIGS. 4*a* to 4*i* show further connection joints.

As illustrated in FIGS. 4a to 4e, it is self-evidently also possible for other forms of seam and connection joints to be taken into consideration. For example, FIG. 4a shows a connection joint 30 in the case of which the first component 2 and the second component 10 enclose a right angle. A fusion seam 26 is arranged at an inside edge 28 and could be realized for example by means of the rotating tool 16 if the axis of rotation thereof encloses the same angle with both components 2 and 10, that is to say forms an angular bisector. The connection joint 30 is known for example as a corner joint.

Figure 4B:
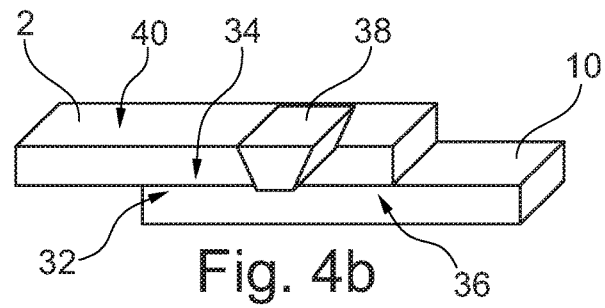

FIG. 4b shows a connection joint 32 in the case of which the first component 2 forms a much larger first joining surface 34 than in the other examples. The second component 10 has a second joining surface 36 which corresponds to said first joining surface and which is placed against the first joining surface 34. The two components 2 and 10 overlap, and the connection joint 32 is therefore an overlap joint. A fusion seam 38 extends from an outer, first component surface 40 in the direction of the connection joint 32 and partially also extends into the second component 10.

Figure 4C:
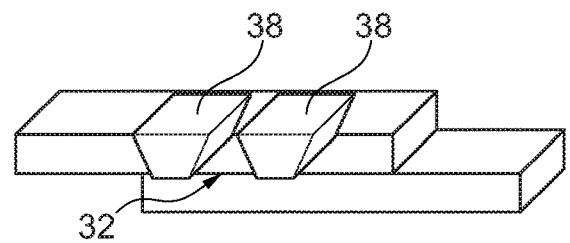

FIG. 4c likewise shows the overlap joint 32, wherein two fusion seams 38 are however provided in order to realize a higher tensile strength.

Figure 4D:
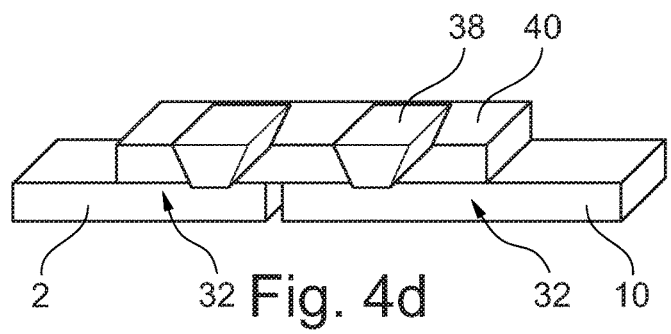

FIG. 4d shows an arrangement of a first component 2, a second component 10 and a web 40 as further component. Here, two overlap joints 32 are formed. A fusion seam 38 extends through each of the overlap joints 32.

Figure 3:
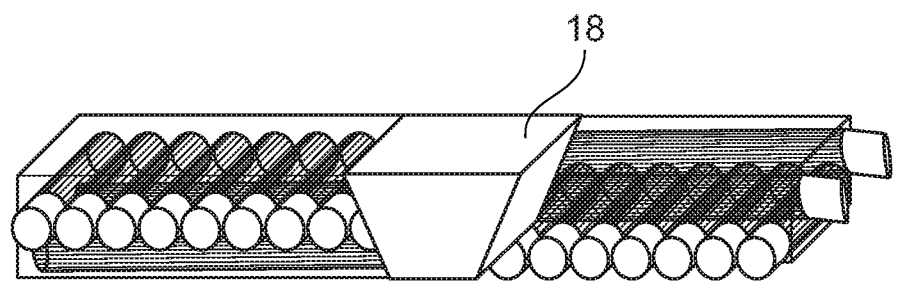
Figure 4E:
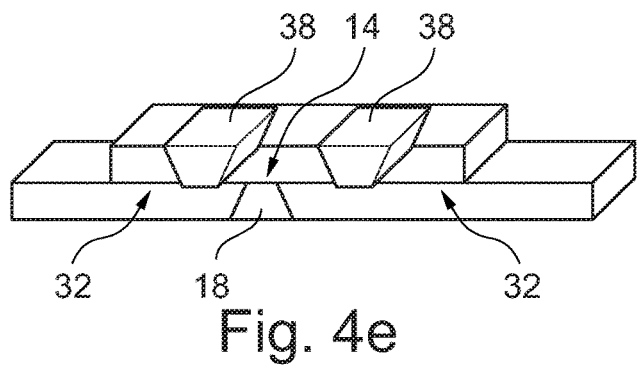

FIG. 4e shows a further variant, which is a combination of the illustration in FIG. 4d and FIG. 3. Here, it is consequently the case that two fusion seams 38 and one fusion seam 18 is arranged at one butt joint 14.

Figure 4F:
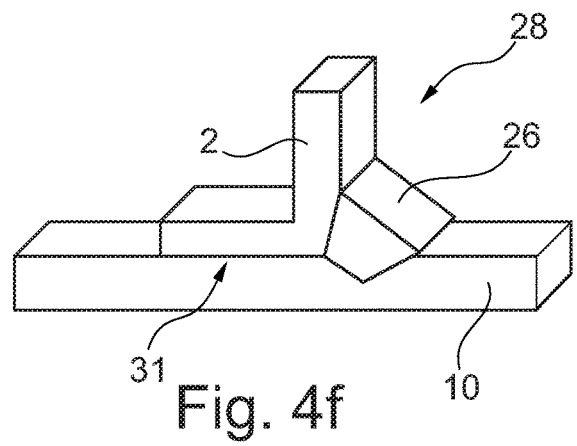

FIG. 4f shows a connection joint 31 at an L-shaped first component 2 and a flat second component 10. The fusion seam 26 corresponds to that from FIG. 4a.

Figure 4G:
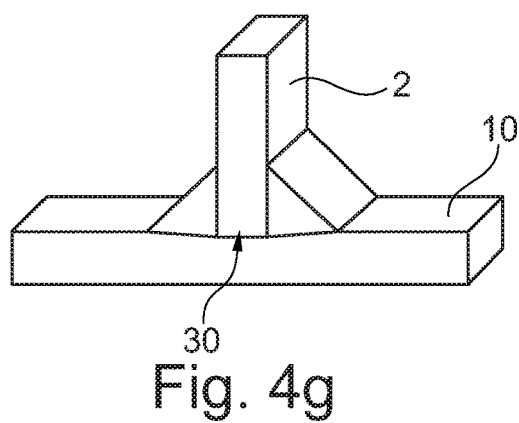

FIG. 4g shows a connection joint 30 similar to that in FIG. 4a, wherein, however, additional material has been applied and fused at the inside edges 28, such that no cutting-off of fibres has taken place.

Figure 4H:
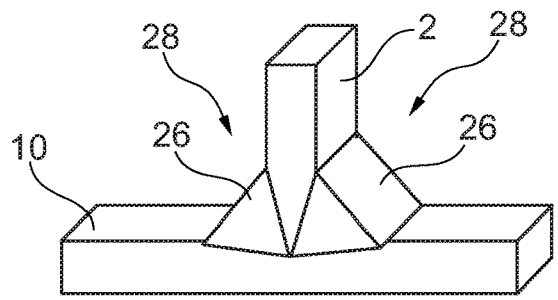

FIG. 4h is a modification of FIG. 4a, wherein two inside edges 28 are provided with a fusion seam 26.

Figure 4I:
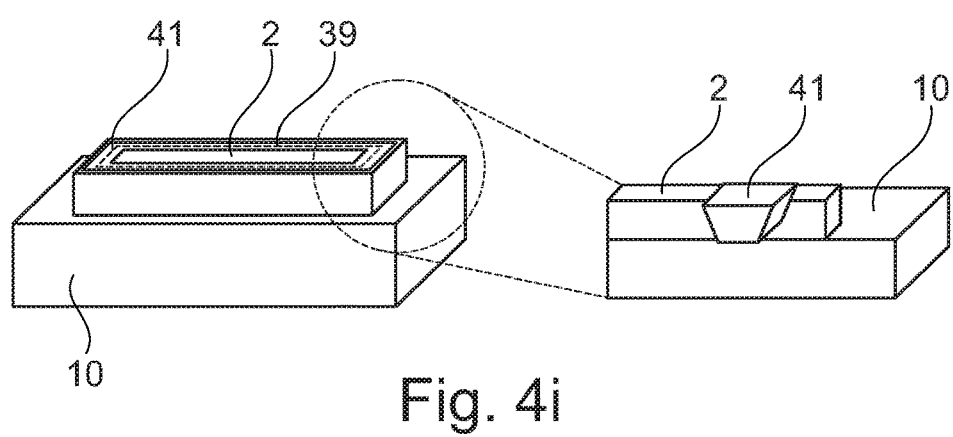

FIG. 4i shows a fusion seam 41 formed along a closed contour 39. The first component 2 may for example lie flat on the second component 10 and be welded in a flat manner to the second component 10 by movement of the tool 16 along the contour 39.

Figure 5:
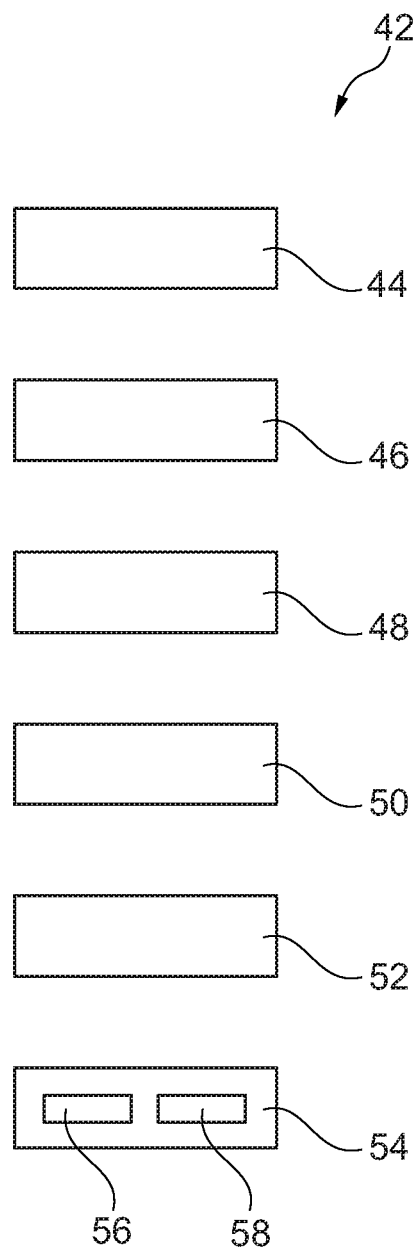
FIG. 5 shows a schematic block-based illustration of a method for connecting two components.

FIG. 5 shows, for the sake of completeness, a schematic block-based illustration of a method 42 according to an aspect of the invention, having the steps of provision 44 of a first component with a first joining surface, of provision 46 of a second component with a joining surface, of flush placement 48 of the first joining surface against the second joining surface in order to form a connection joint, of placement 50 of a friction stir welding tool against the connection joint, or a surface directly adjacent thereto, of at least one of the components, of softening 52 of the first component and of the second component, in each case in a region adjacent to the connection joint, by rotation of the tool, such that the thermoplastic plastic of the two components locally fuses, and of movement 54 of the tool along the connection joint for the purposes of connecting the two components by formation of a fusion seam. As a result of the rotation of the tool, portions of reinforcement fibres are cut off 56 from the respectively adjacent regions and are stirred into 58 the fusion seam in order to increase the strength of the fusion seam.

It is additionally pointed out that "having" or "comprising" does not rule out other elements or steps, and "a" or "an" does not rule out a multiplicity. It is also pointed out that features that have been described with reference to one of the above exemplary embodiments may also be used in combination with other features of other exemplary embodiments described above. Reference signs in the claims are not to be regarded as limiting.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE SIGNS

2 First component
4 First joining surface

6 Reinforcement fibre
8 Matrix material
10 Second component
12 Second joining surface
14 Connection joint
16 Tool
18 Fusion seam
20 Adjacent region
22 Adjacent region
24 Projection
26 Fusion seam
28 Inside edge
30 Connection joint
31 Connection joint
32 Connection joint, overlap joint
34 First joining surface
36 Second joining surface
38 Fusion seam
39 Contour
40 Component surface
41 Fusion seam
42 Method
44 Provision of first component
46 Provision of second component
48 Flush placement
50 Placement of the tool
52 Softening
54 Movement
56 Separation
58 Stirring-in

The invention claimed is:

1. A method for connecting components which have a fibre-reinforced thermoplastic plastic, the method comprising:
   providing a first component with a first joining surface;
   providing a second component with a second joining surface;
   flush placement of the first joining surface against the second joining surface in order to form a connection joint;
   placing a friction stir welding tool against the connection joint, or a surface directly adjacent thereto, of at least one of the components;
   softening the first component and the second component, in each case in a region adjacent to the connection joint, by rotation of the tool, such that the thermoplastic plastic of the two components locally fuses; and
   moving the tool along the connection joint for the purposes of connecting the two components by formation of a fusion seam,
   wherein portions of reinforcement fibres are stirred into the fusion seam in order to increase the strength of the fusion seam
   wherein the first and second components comprise reinforcement fibres, and portions of the reinforcement fibres are separated from the respectively adjacent regions of the components, and stirred into the fusion seam, as a result of the rotation of the tool,
   wherein the tool has a frustoconical tip with a lateral surface on which radial projections, channels or indentations are arranged, and
   wherein the tool cuts the reinforcement fibres.

2. The method according to claim 1, wherein, during the movement along the connection joint, the tool is pressed on in order to generate a targeted surface friction.

3. The method according to claim 1,
   wherein the connection joint is a butt joint, wherein the first joining surface and the second joining surface are in each case end surfaces and lie against one another in butting fashion, and
   wherein the tool is moved along the connection joint transversely with respect to the first and second components and an axis of rotation of the tool runs parallel to the joining surfaces.

4. The method according to claim 1,
   wherein the connection joint is a corner, T or oblique joint, and the first and second components form an inside edge, and
   wherein the tool is placed against the inside edge and an axis of rotation of the tool encloses a substantially equal angle with both components.

5. The method according to claim 1,
   wherein the connection joint is an overlap joint, and
   wherein the tool is placed onto one of the first and second components and is oriented transversely with respect to the joining surface,
   wherein the tool generates a fusion seam extending from one of the first and second components directly adjacent to the tool into the adjacent other of the first and second components.

6. The method according to claim 5, wherein two or more mutually spaced-apart fusion seams are generated on the same joining surface.

7. The method according to claim 1, wherein the connection joint is formed along a closed contour.

8. The method according to claim 1, wherein the thermoplastic plastic is selected from a group of plastics, the group consisting of:
   polypropylene styrene (PPS);
   polyether ether ketone (PEEK);
   polyether ketone ketone (PEKK);
   polyetherimide (PEI); and
   polyaryl ether ketone (PAEK).

9. The method according to claim 1, wherein the reinforcement fibres are carbon fibres or glass fibres.

10. The method according to claim 1, wherein, in addition to the portions of reinforcement fibres, an additive is mixed in in order to improve the strength of the fusion seam.

11. The method according to claim 1, wherein the first and second components are in the form of fuselage or structural components of an aircraft.

* * * * *